Aug. 1, 1950 K. E. QUEITZSCH 2,517,346
QUICK RELEASE CHUCK
Filed Nov. 26, 1946
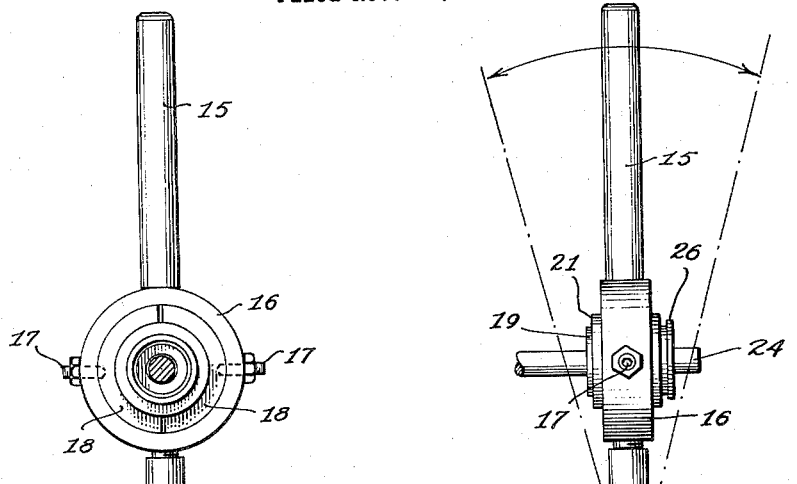
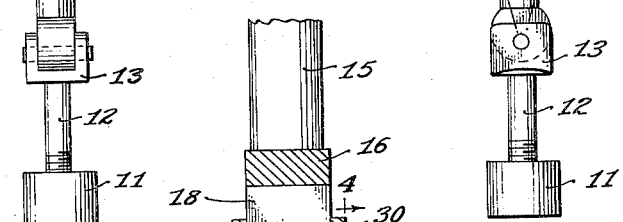
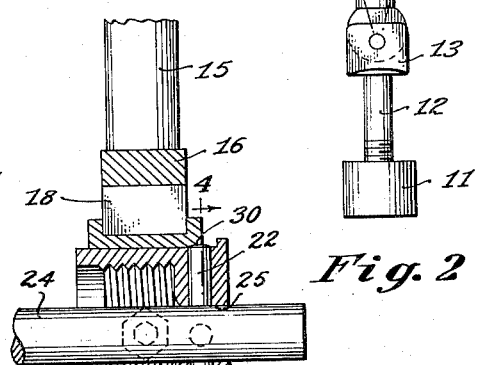
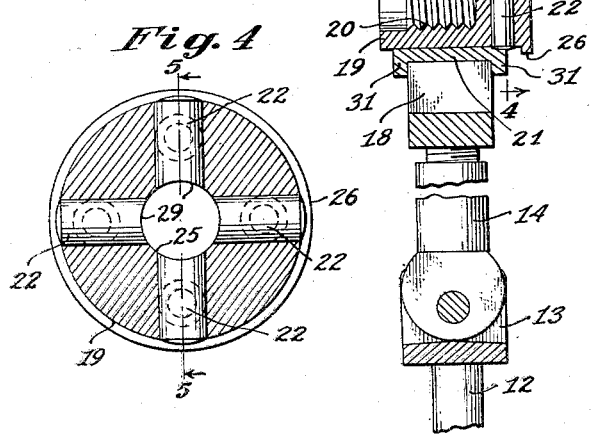
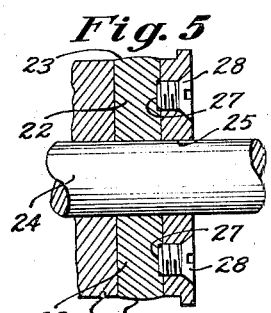
Inventor
KARL E. QUEITZSCH
By McMorrow, Berman & Davidson
Attorneys Patented Aug. 1, 1950

2,517,346

UNITED STATES PATENT OFFICE 2,517,346

QUICK RELEASE CHUCK

Karl E. Queitzsch, York, Pa.

Application November 26, 1946, Serial No. 712,447

2 Claims. (Cl. 279—74)

This invention relates to lathe tools and more particularly to a chuck device employed to secure and accurately center bar stock or any short work piece to the lathe head stock, for turning operations on said bar stock or short work pieces.

A main object of the invention is to provide a novel and improved chuck device adapted to release or secure accurately bar stock or short work pieces while the lathe spindle is rotating at turning speed, said chuck device being very simple in structure, easy to operate and providing rapid engaging and releasing action with respect to the bar being turned.

A further object of the invention is to provide an improved chuck device for lathe operations on bar stock, said device being very sturdy in construction, easy to install and providing a reliable gripping action on the bar stock, yet being quickly engageable and releasable with respect thereto.

Further objects and advantages of the invention will become apparent from the following description and claims, and from the accompanying drawings, wherein:

Figure 1 is a front elevational view of a chuck device according to the present invention.

Figure 2 is a side elevational view of the chuck device of Figure 1 showing a piece of bar stock engaged therewith.

Figure 3 is an enlarged vertical cross-sectional view taken through the chuck device of Figure 1.

Figure 4 is a cross-sectional detail view taken on line 4—4 of Figure 3.

Figure 5 is a detail cross-sectional view taken on line 5—5 of Figure 4.

Referring to the drawings, 11 designates a base member adapted to be secured to a lathe bed forwardly adjacent to and in vertical alignment with the head stock spindle of the lathe. Threaded into base member 11 is a vertical post member 12 having a bifurcated head portion 13. Pivotally secured in head portion 13 for swinging movement in the vertical longitudinal plane of the spindle is an arm 14. Secured to arm 14 is a circular frame member 16 which is substantially concentric with the spindle axis and located in a transverse vertical plane with respect thereto. Secured to the top of frame 16 is a handle member 15 which is substantially in alignment with arm 14.

Pivotally secured in the respective side portions of frame 16 by horizontal bolts 17, 17 are a pair of semi-circular bearing segments 18, 18. Rotatably positioned in bearing segments 18, 18 is a cylindrical chuck member 19, said chuck member being adapted to be threadedly secured by internal threads 20 to the head stock spindle of the lathe. Between chuck member 19 and bearing segments 18, 18 is a bushing 21 having end flanges 31, 31 engaging the sides of the segments and which is rotatable with respect to the segments. Flanged bushing 21 is longitudinally slidable on chuck member 19 which is provided with a plurality of radial gripping pins which are of any suitable cross-sectional shape, such as round, square, or rectangular, shown at 22 slidably mounted in radial bores formed in the chuck member. Pins 22 project slightly beyond the outer periphery of chuck member 19 as shown at 23 so that said pins may be forced inwardly by engagement with the inner surface of flanged bushing 21 as said bushing is moved rearwardly on chuck member 19. The inward movement of pins 22 provides a firm gripping action on a work piece 24 fed axially through the head stock spindle of the lathe.

Chuck member 19 is formed with an axial end opening 25 slightly larger in diameter than the work piece 24 and is flanged at 26 to prevent bushing 21 from being moved rearwardly off the chuck member when no work piece is held in the chuck. The pins 22 are recessed and flattened at 27 and are engaged by machine screws 28 at said flattened portions which prevent the pins from turning yet permit said pins to be moved through the required radial distances for gripping the work piece.

The horizontal pivots 17, 17 permit the bearing segments 18, 18 to adjust themselves with respect to frame 16 so as to move parallel with respect to chuck member 19 as handle 15 is rotated through a substantial arc, such as is indicated in Figure 2. In a substantially vertical position of said handle bushing 21 engages the pins 22 to cam them inwardly to grip the work piece so as to center the work piece with respect to the spindle. By moving the handle to the left, as viewed in Figure 3, bushing 21 may be quickly disengaged from pins 22 to release the work piece while the spindle is rotating at operating speed. A new work piece may then be inserted through the spindle and through the opening 25, and by moving handle 15 back to a position wherein bushing 21 engages pins 22, the new work piece may be quickly secured in the chuck for lathe operations therein.

Pins 22 are concave at their gripping ends, as shown at 29 in Figure 4, to conform with the cylindrical contour of round bar stock. Said concave ends interlock with the bar stock to aid in preventing rotation of the pins with respect to the stock. Rotation of the pins is also prevented by the engagement of screws 28 with the flattened recess portions 27, as above described.

The inner surface of flanged bushing 21 is slightly flared adjacent pins 22, as indicated at 30, to facilitate camming engagement of the bushing with the projecting portions 23 of the pins.

The chuck may be set up for movement of the handle 15 in either of the directions from vertical indicated in Figure 2.

Although intended mainly for use with round stock, the chuck device may obviously be employed with stock of non-circular cross-section, such as hexagonal, octagonal, and the like. Any cross-sectional size or diameter of bar stock may be employed up to the largest size which can be accommodated in the hole through the spindle.

While a specific embodiment of a quick-releasing lathe chuck has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A chuck device for use upon a lathe having a bed and a rotatable screw threaded spindle, said device comprising an upright post for securement to the bed of the lathe, an elongated generally upright handle pivotally secured to the top of the post for swinging movement in a vertical plane and longitudinally of the spindle, an annular ring connected in the handle and having its axis substantially coinciding with the longitudinal axis of the spindle, arcuate bearing segments pivotally secured within the bore of the annular ring and held against rotation, the bearing segments being swingable vertically with respect to the annular ring to a limited extent, a freely rotatable bushing journaled within the bearing segments and held against axial movement with respect to the segments and having a cylindrical bore which is flared at one end of the bushing for forming a cam surface, a substantially cylindrical chuck head mounted within the bore of the bushing for rotation with the bushing and provided in one end with an internally screw threaded recess for receiving the screw threaded spindle of the lathe, the chuck head rotating with the spindle of the lathe, the chuck head being provided near its opposite end with a plurality of circumferentially spaced radial openings, radially shiftable gripping pins mounted within the radial openings and projecting radially beyond the periphery of the chuck head for engagement with the cam surface of the bushing when the upright handle is swung vertically to force the gripping pins radially inwardly, and a stop secured to the chuck head for engagement with the bushing to limit the relative axial movement of the bushing and chuck head.

2. A chuck device for use upon a lathe having a rotatable screw threaded spindle and a lathe bed, the device comprising an elongated upstanding handle pivotally connected with the lathe bed for limited vertical swinging movement longitudinally of the spindle axis, an annular ring connected in the handle and having its axis substantially coinciding with the longitudinal axis of the spindle, arcuate bearing segments pivotally mounted within the annular ring, a bushing rotatably mounted within the bearing segments and held against axial movement relative to the bearing segments and ring, the bushing having a cylindrical bore which is flared at one end of the bushing for forming a cam surface, a substantially cylindrical internally screw threaded chuck head mounted within the bore of the bushing for rotation with the bushing and secured to the screw threaded lathe spindle for rotation therewith, the bushing being axially shiftable upon the chuck head when the handle is swung in either direction, the chuck head having a plurality of circumferentially spaced radial openings formed therein near its end remote from the lathe spindle, the end of the chuck head remote from the lathe spindle being provided with an annular radial flange forming a shoulder, and a plurality of radially shiftable gripping pins slidably mounted within the radial openings of the chuck head and projecting radially beyond the periphery of the chuck head for engagement with the cam surface of the bushing when the bushing is shifted axially in one direction by the handle, the shoulder of the chuck head limiting the axial shifting movement of the bushing in such direction.

KARL E. QUEITZSCH.

REFERENCES CITED

The following references are of record in the file of this patent:

UNITED STATES PATENTS

| Number | Name | Date |
|---|---|---|
| 545,312 | Rivett | Aug. 27, 1895 |
| 1,410,612 | Sherman | Mar. 28, 1922 |
| 1,864,786 | Wilkins | June 28, 1932 |
| 2,403,100 | Geren | July 2, 1946 |

FOREIGN PATENTS

| Number | Country | Date |
|---|---|---|
| 630,720 | Germany | of 1936 |